United States Patent Office 3,120,501
Patented Feb. 4, 1964

3,120,501
CYCLIC COMPOUNDS CONTAINING
BORON-BORON BONDS
Robert J. Brotherton, Fullerton, Calif., assignor to United States Borax & Chemical Corporation, Los Angeles, Calif., a corporation of Nevada
No Drawing. Filed Mar. 20, 1962, Ser. No. 181,191
1 Claim. (Cl. 260—551)

The present invention relates as indicated to new cyclic compounds containing boron-boron bonds, and has further reference to a method for preparing the same.

It is, therefore, the principal object of this invention to provide new cyclic compounds containing boron-boron bonds and methods for making the same.

It is a further object of this invention to provide as new compositions the benzo-1,4-diaza-2,3-diborines.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises cyclic compounds containing boron-boron bonds having the formula

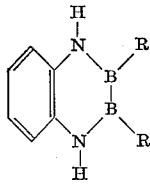

where R is selected from the group consisting of primary and secondary alkyl radicals of from 1 to 6 carbon atoms and phenyl.

The benzo-1,4-diaza-2,3-diborines of the present invention are useful chemical intermediates for the preparation of a variety of other organoboron compounds. The present compounds are potent reducing agents which have utility in a number of chemical processes, such as chemical plating. These compounds also have utility as corrosion inhibitors when added to cooling and hydraulic fluid systems, and they are excellent bacteriostatic agents to prevent bacterial growth in the storage of hydrocarbon fuels.

The preparation of the compounds of the present invention can best be illustrated by the following equation:

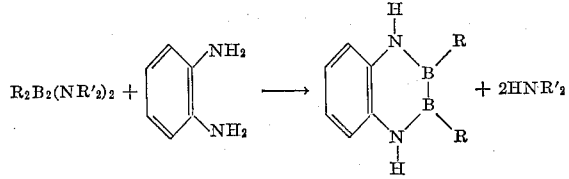

where R is either a primary or a secondary alkyl radical of from 1 to 6 carbon atoms or phenyl, and R' is an alkyl radical of from 1 to 3 carbon atoms.

The preferred method for performing the above reaction is to admix a dialkyl or diphenyl(dialkylamino)diboron compound with o-phenylenediamine, either alone or in the presence of a solvent inert to the reactants. The reaction mixture is then slowly heated and the dialkylamine reaction product is continuously removed from the reaction mass. After the dialkylamine evolution has substantially stopped, any remaining solvent is removed and the reaction mass is subjected to fractional distillation or sublimation to separate the desired benzo-1,4-diaza-2,3-diborine from any by-products.

It will be noted that the present reaction will proceed if no solvent is present, however, in the preferred embodiment of the invention I perform the reaction in the presence of an inert solvent. The common commercially available hydrocarbon solvents such as benzene, xylene, dodecane, n-heptane, toluene, etc. are all applicable to the present invention for use as the inert solvent.

As regards the reactants applicable to the present invention, the firt of these is o-phenylenediamine. o-Phenylenediamine is well known to the art, and is presently commercially available from a number of producers.

The other reactants applicable to the present invention are the 1,2-dialkyl- or 1,2-diphenyl-1,2-bis(dialkylamino)-diboron compounds having the formula $R_2B_2(NR'_2)_2$, where R is either a primary or secondary alkyl radical of from 1 to 6 carbon atoms or phenyl, and R' is an alkyl radical of from 1 to 3 carbon atoms. These compounds are produced by the reaction of the corresponding alkyl or phenyl(dialkylamino)haloborane with an alkali metal. The following illustrates the method for preparing these diboron reactants.

A mixture of 10.2 grams (0.26 mole) of potassium in 350 ml. of xylene was refluxed with vigorous agitation. 33.5 grams (0.20 mole) of chloro(dimethylamino)phenylborane in 50 ml. of xylene was added and the reaction mixture was heated at reflux for 2 hours. The solid mixture of unreacted potassium and potassium chloride reaction product was filtered off and xylene was removed from the filtrate at reduced pressure and 1,2-diphenyl-1,2-bis(dimethylamino)diboron was recovered. Chemical analysis yielded the following results.

Calculated for $C_{16}H_{22}B_2N_2$: B=8.19%, C=72.8%, H=8.3%, mol. wt.=264. Found in product: B=8.14%, C=72.4%, H=8.53%, mol. wt.=263.

The following list is illustrative of the applicable diboron reactants:

1,2-dimethyl-1,2-bis(dimethylamino)diboron
1,2-diethyl-1,2-bis(dimethylamino)diboron
1,2-diphenyl-1,2-bis(dimethylamino)diboron
1,2-dimethyl-1,2-bis(diethylamino)diboron
1,2-diisopropyl-1,2-bis(diethylamino)diboron
1,2-di-n-butyl-1,2-bis(diethylamino)diboron
1,2-di-n-hexyl-1,2-bis(di-n-propylamino)diboron
1,2-diisoamyl-1,2-bis(di-n-propylamino)diboron
1,2-diethyl-1,2-bis(diisopropylamino)diboron
1,2-di-n-propyl-1,2-bis(diisopropylamino)diboron It is to be clearly understood that the foregoing list is only a partial enumeration of the diboron reactants applicable to the present invention, and is not intended to limit the invention.

So that the present invention is more clearly understood, the following examples are given for illustrative purposes:

I 1,2-diethyl-1,2-bis(dimethylamino)diboron, 120 mg. (0.78 mmole), was distilled into 50 mg. (0.46 mmole) of o-phenylenediamine at −196° C. in a vacuum system, and was then allowed to warm and was kept at ambient temperature for about 16 hours. Dimethylamine was continuously removed from the reaction mass as it was slowly heated over about a 4 hour period to about 105° C., at which time dimethylamine evolution had substantially stopped yielding about 73% of the theoretical dimethylamine. The reaction mass was then separated to yield the excess 1,2-diethyl-1,2-bis(dimethylamino)diboron, a non-volatile liquid reaction product, and 2,3-diethyl-1,4-diazabenzodiborine-2,3, a white sublimable solid, M.P. 50–54° C. Chemical analysis of the product yielded the following data:

Calculated for $C_{10}H_{16}B_2N_2$: C=64.61%, H=8.68%, N=15.07%, B=11.64%. Found in product: C=65.83%, H=9.00%, N=14.37%, B=11.13%.

II

A solution of 0.40 gram (3.70 mmoles) of o-phenylenediamine and 0.95 gram (3.60 mmoles) of 1,2-diphenyl-1,2-bis(dimethylamino)diboron in 40 ml. of xylene was placed in a 250 ml. round-bottomed flask, equipped with a reflux condenser and a nitrogen inlet. Dry nitrogen was passed over the reaction mixture which was heated at about 80° C. for about 72 hours, at which time dimethylamine evolution had substantially ceased and about 66% of the theoretical dimethylamine had been recovered. The xylene was then removed at reduced pressure, and the reaction mass was separated to yield the desired 2,3-diphenyl-1,4-diazabenzodiborine-2,3, a white solid M.P. 100–101° C. Chemical analysis of the product yielded the following data:

Calculated for $C_{18}H_{16}B_2N_2$: C=76.67%, H=5.72%, N=9.93%, B=7.68%. Found in product: C=78.28%, H=6.42%, N=9.80%, B=7.17%.

III

A solution of 1.08 grams (10 mmoles) of o-phenylenediamine and 2.52 grams (10 mmoles) of 1,2-diisopropyl-1,2-bis(diethylamino)diboron in 60 ml. of toluene was placed in a 250 ml. round-bottomed flask having a nitrogen inlet. Dry nitrogen was passed over the reaction mixture which was heated at about 100° C. for about 48 hours, after which time diethylamine evolution had substantially ceased and about 76% of the theoretical diethylamine had been recovered. The toluene was then removed at reduced pressure, and the reaction mass was separated to yield the desired 2,3-diisopropyl-1,4-diazabenzodiborine-2,3, a white solid, M.P. 68–72° C. Chemical analysis of the product yielded the following data:

Calculated for $C_{12}H_{20}B_2N_2$: C=67.37%, H=9.42%, N=13.10%, B=10.11%. Found in product: C=68.06%, H=9.58%, N=12.84%, B=10.37%.

Other modes of applying the principle of the invention may be employed, change being made as regards the details described, provided the features stated in any of the following claim or the equivalent of such be employed.

I, therefore, particularly point out and distinctly claim as my invention:

2,3-diphenyl-1,4-diazabenzodiborine-2,3.

References Cited in the file of this patent

Fritz et al.: Angewandte Chemie, vol. 73, page 762, Dec. 7, 1961.